United States Patent
Bohn et al.

(10) Patent No.: US 7,526,109 B2
(45) Date of Patent: Apr. 28, 2009

(54) FINGERPRINT SCANNER WITH TRANSLATING SCAN HEAD

(75) Inventors: David D. Bohn, Fort Collins, CO (US); Derek L. Knee, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 638 days.

(21) Appl. No.: 10/722,795

(22) Filed: Nov. 26, 2003

(65) Prior Publication Data

US 2005/0111707 A1    May 26, 2005

(51) Int. Cl.
  *G06K 9/00* (2006.01)
(52) U.S. Cl. .............. 382/124; 382/127; 382/315; 382/317; 382/323
(58) Field of Classification Search ............. 382/124, 382/126, 122, 284, 323, 115, 287, 317, 315; 357/71; 250/556
  See application file for complete search history.

(56) References Cited

U.S. PATENT DOCUMENTS

| | | | | |
|---|---|---|---|---|
| 4,569,080 A * | 2/1986 | Schiller | ........... | 382/126 |
| 5,467,198 A * | 11/1995 | Aosaki et al. | ........... | 358/400 |
| 5,942,761 A * | 8/1999 | Tuli | ........... | 250/556 |
| 6,178,255 B1 * | 1/2001 | Scott et al. | ........... | 382/124 |
| 6,182,892 B1 * | 2/2001 | Angelo et al. | ........... | 235/380 |
| 6,317,508 B1 * | 11/2001 | Kramer et al. | ........... | 382/124 |
| 6,337,919 B1 * | 1/2002 | Dunton | ........... | 382/124 |
| 6,970,584 B2 * | 11/2005 | O'Gorman et al. | ........... | 382/126 |
| 7,162,060 B1 * | 1/2007 | Barton et al. | ........... | 382/126 |
| 7,197,168 B2 * | 3/2007 | Russo | ........... | 382/125 |
| 7,403,644 B2 * | 7/2008 | Bohn et al. | ........... | 382/126 |
| 2002/0021827 A1 * | 2/2002 | Smith | ........... | 382/124 |
| 2004/0192442 A1 * | 9/2004 | Wells et al. | ........... | 463/36 |
| 2005/0111706 A1 * | 5/2005 | Bohn et al. | ........... | 382/124 |
| 2005/0111707 A1 * | 5/2005 | Bohn et al. | ........... | 382/124 |

OTHER PUBLICATIONS

Eyenetwatch.com, Biolink Mouse Product Information Sheet.
DigitalPersona, U.are.U Firefly Product Information Sheet.
SecuGen Corporation, SecuGen Optic Module Production Information Sheet.
Government Computer News, http://www.gcn.com/vol1_no1/daily-updates/20435-1.html, Oct. 30, 2003.

* cited by examiner

*Primary Examiner*—Jingge Wu
*Assistant Examiner*—Nancy Bitar
(74) *Attorney, Agent, or Firm*—Shook, Hardy & Bacon LLP

(57) ABSTRACT

An input device with an optical scanner for use in capturing biometric images such as fingerprints. The user places the biometric image on the platen window. Movement of the platen window causes a scan head to move and allows the scan head to scan the biometric image and capture a series of scan lines. The series of scan lines are combined together to form an image representative of the biometric image.

22 Claims, 8 Drawing Sheets

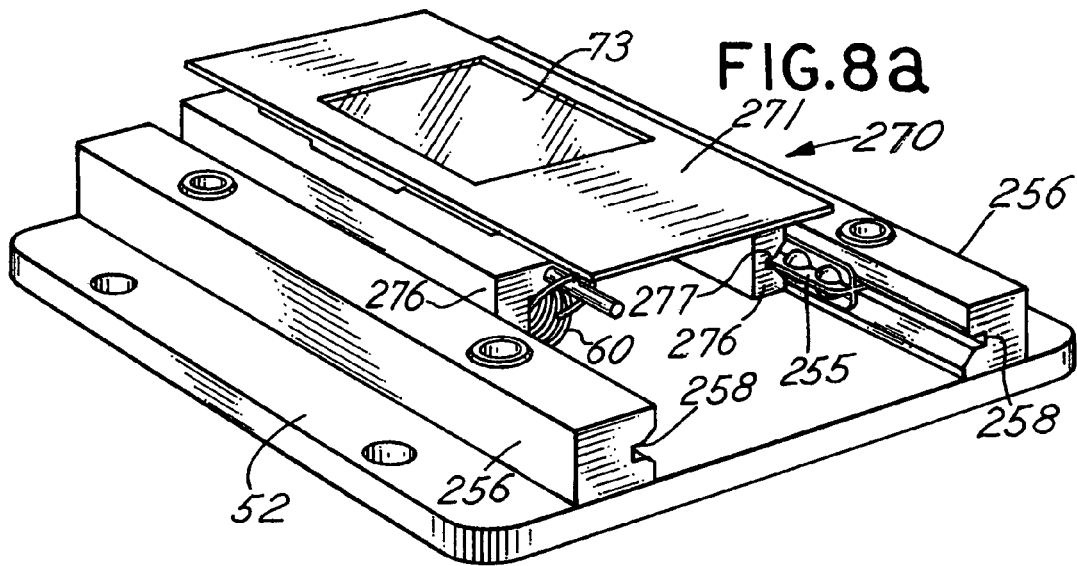
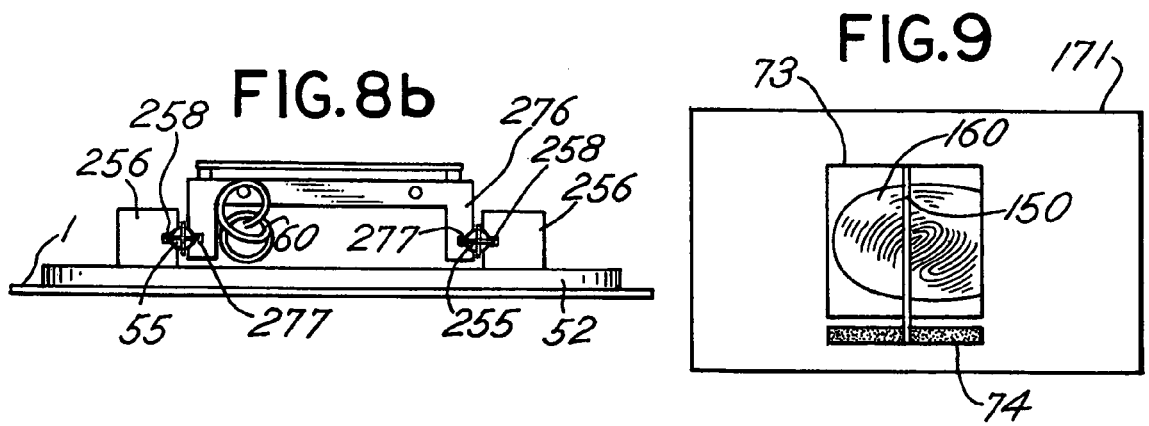
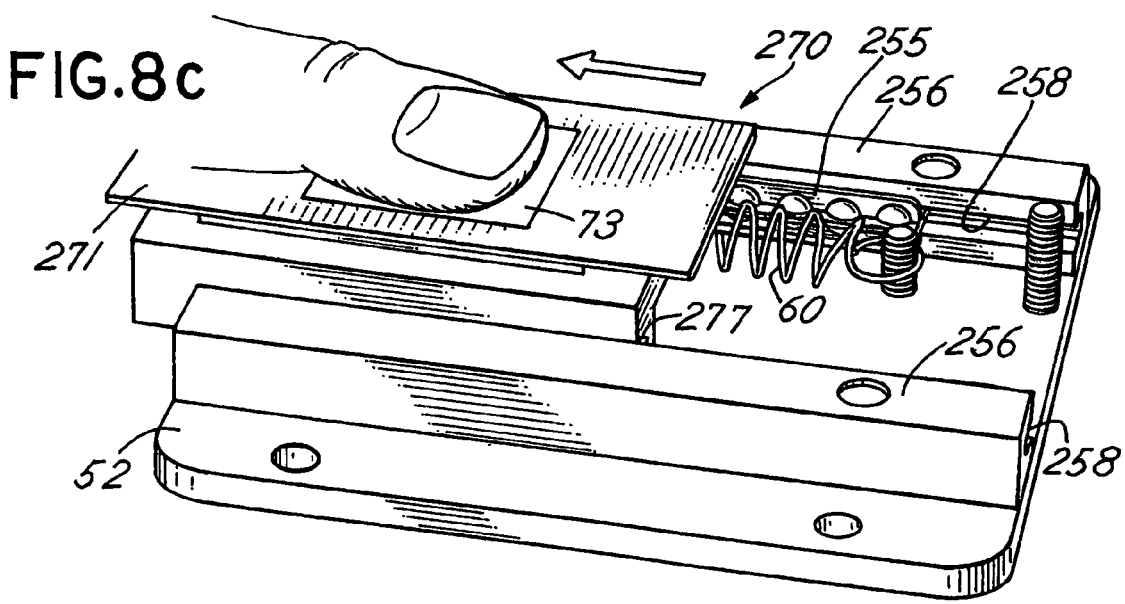

FINGERPRINT SCANNER WITH TRANSLATING SCAN HEAD

CROSS REFERENCE TO RELATED APPLICATION

This application is related to U.S. patent application Ser. No. 10/722,631 entitled "Fingerprint Scanner with Translating Platen," filed simultaneously with the present application.

FIELD OF THE INVENTION

The present invention relates generally to the field of biometric image identification and/or verification via optical scanning.

DESCRIPTION OF RELATED ART

Biometric identification techniques, such as fingerprints, are well known, having been used for years in the criminal justice system to aid in identifying individuals. Biometric techniques have also become increasingly prevalent as a technique of reducing fraud, for instance some retailers and financial institutions require fingerprinting non-member persons who are writing or cashing checks. In addition, biometric techniques have been used to control access to high security facilities, both in the public and private sector. Biometric images have been used for controlling access to facilities because other methods such as passwords or security cards are easily compromised.

While the traditional financial and retail world is susceptible to fraud, the problem becomes more severe in electronic systems, such as the global computer network known as the Internet. The potential cost is greater in such a computer network because stolen information can be used rapidly in locations scattered about the globe before the fraud is detected. The difficulty in tracking down individuals hiding behind false identities and stolen passwords makes the whole commercial electronic marketplace susceptible to identity theft and consumer fraud.

Biometric identification devices, such as fingerprint scanners, help solve the problem of unauthorized access by using the person's fingerprint as an additional method of verification. While fingerprint scanners have been used for some time to control access to secure facilities, fingerprint scanners are now starting to be used to control access to computer networks. For instance, a public health organization recently began using a computer mouse equipped with a fingerprint scanner to control access to the network in place of using a password. Manufactures now offer various input devices equipped with fingerprint scanners to provide network access control to the users.

Other uses for biometric identification include verification that an individual making a purchase over the Internet with a credit card is the owner of the credit card. This need is especially acute in purchases over the Internet because there is no easy to verify the person using the credit card is the owner of the credit card. The retailer could request a verification scan of the fingerprint and a successful identification would allow the purchase to go through.

Optical scanning devices for scanning fingerprints are known in the art. The devices typically use a two dimensional array of sensor elements to capture the fingerprint image in a single picture. Once such device uses a 260 by 300 array of sensors to capture a 13 mm by 15 mm image. Another such device uses a 284 by 400 array of sensors to capture a 0.71 inch by 1.1 inch image. While such methods are capable of capturing fingerprint images, they suffer from high costs. Efforts to reduce the cost of such scanners are limited by the need to scan an image the size of a fingerprint, therefore requiring a fixed amount of silicon to produce the sensor.

Biometric image scanners, such as fingerprint scanners, that use optics typically use a platen made of glass or polymeric materials that are typically not compliant. When a user presses down on the platen, some deflection of the user's tissue necessarily results. The deflection, however, depends on the force exerted by the user. Thus, one problem with scanning biometric images is that inconsistent deflection of the user's tissue can lead to inconsistent scanning results. It can be difficult or expensive, when using existing optical scanners, to ensure the biometric image is placed on the platen in a relatively constant manner.

BRIEF SUMMARY OF THE INVENTION

An aspect of the present invention is a compact, simplified, high performance optical scanner in which a biometric image is placed on a platen and the platen is moved, where the movement of the platen causes an optical scan head to capture the biometric image in a series of scan lines. The scan lines, when processed and assembled, can provide an image representative of the biometric image suitable for use in identifying the individual. A platen assembly is mounted in a moveable manner to a housing. The platen assembly contains a platen window upon which the biometric image is placed when the scanner is to be used. Force exerted on the platen window by the individual using the scanner causes the platen assembly to move along a housing motion way. The platen assembly is moved, relative to the housing, away from a first position towards a second position. A biasing device, the biasing device directing the platen assembly towards the first position, opposes the movement of the platen assembly. The movement of the platen assembly allows the biometric image to traverse, in a relative manner, across the optical scan head. The scan head captures a scan line of data and monitors the position of the platen assembly through the use of an encoder target. When the platen assembly has moved far enough, another row of scan line data is captured. This process continues until the scan is complete. A tactile and/or audible indication from an end of scan switch can let the individual know that the scan is complete. The individual removes the biometric image from the platen window and the platen assembly, being biased towards the first position, returns to the first position.

In an aspect, the platen window is composed of transparent material such glass or polycarbonate to allow the scan head to detect the biometric image. The encoder target consists of a pattern of darker and lighter regions. Once the platen window begins to move relative to the scan head, the encoder target can be monitored. When the scan head has traversed far enough across the platen window to encounter a change in the pattern found on the encoder target, another scan line of the biometric image is captured. The pattern on the encoder target can allow the scan lines to be processed and assembled in a manner so that the combination of scan lines represents the biometric image of the individual using the input device.

In an aspect, a platen assembly moves along the housing motion way associated with the housing. In an exemplary embodiment, the housing motion way is a vertical guiding slot and force applied on the platen window causes the platen assembly to move downward toward the guiding slot. When moving in a vertical direction, the platen assembly may be equipped with a vertical motion way such as a guide member that can interface with the guiding slot and the guiding slot can have a linear bearing to provide smooth movement of the platen. When the platen assembly is moved vertically, the downward movement of the platen assembly pushes on the scan head assembly and causes the scan head assembly to move in a downward angle along an angled surface way contained within the housing. The downward translation of the scan head assembly in response to the downward motion of the platen assembly allows the scan head to maintain a relatively constant distance between the scan head and the platen window. The angle of the translation along the angled surface way also causes the scan head to traverse across the platen window. As the scan head traverses the platen window, the encoder target is monitored and a scan line of the biometric image and the encoder target can be captured at a predetermined pattern in the encoder target.

In another aspect, the scan head is fixed to the housing. In an embodiment, the biometric image is placed on the platen window and force is applied by the user to slide the platen assembly along a housing motion way. The sliding of the platen assembly causes the platen window and the accompanying biometric image to traverse across the scan head. As the platen window traverses across the scan head, the scan head monitors the encoder target and captures scan lines of the biometric image and the encoder target at predetermined pattern along the encoder target.

In an aspect of the present invention, the scan head is a typical line scanner. In an exemplary embodiment, the scan head comprises a light source, a gradient indexed lens array, and a contact image sensor. The light source is projected unto the platen window and the encoder target. The reflection passes through the lens array and is focused unto the image sensor. The image from the scan head can be processed locally, be sent to a processing point outside of the housing, or some combination thereof. The processing involves combining the series of captured scan lines in the proper order so an image representative of the biometric image can be assembled.

An aspect of the present invention is that a linear array of gradient indexed lens can be utilized, thus decreasing the size of the sensor and the required amount of silicon. Thus a fingerprint scanner can be made with a lower cost so as to enable widespread use of the fingerprint scanners in computer input devices.

Another aspect of the present invention is that the device is configured for the user to inherently apply a certain level of pressure on the platen window to move the platen assembly. This ensures a relatively constant deflection of individual's tissue. Thus, the present invention can help ensure reliable and consistent biometric image scans.

Another aspect of the present invention is that a single sensor can be use to capture both the biometric image and monitor the encoder pattern. It would be advantageous to reduce the cost of the scanner so as to improve marketability. The use of a single sensor can reduce the cost and complexity and can also reduce the size the scanner. Thus, biometric scanners such as fingerprint scanners can be readily implemented in regular consumer devices and provide an increased level of security for electronic transactions over computer networks such as the Internet.

These and other features and advantages will be understood or apparent to those of ordinary skill in the art from the following detailed descriptions of the invention, as illustrated in the various drawing figures and exemplary embodiments.

BRIEF DESCRIPTION OF THE DRAWINGS

The present invention is illustrated by way of example and not limited in the accompanying figures in which like reference numerals indicate similar elements and in which:

FIG. 4 is a cross-sectional view of a platen assembly taken along the line 4-4 of FIG. 3a.

FIG. 7c is a side view of the embodiment illustrated in FIG. 5 with the outer housing removed, where the platen assembly is in an end position.

FIG. 8a is an isometric view of an alternative embodiment of a fingerprint scanner in accordance with the present invention.

FIG. 8b is a side view of the fingerprint scanner shown in FIG. 12a showing how the platen assembly is supported by the housing frame.

FIG. 8c is an isometric view of the fingerprint scanner as shown in FIG. 12a, illustrating the platen assembly moved away from the first position.

FIG. 9 is a simplified cross-section view of the platen assembly taken along the line 9-9 of FIG. 7a FIG. 10 illustrates a flow chart demonstrating a method for controlling the scan head.

DETAILED DESCRIPTION OF THE INVENTION

Reference will now be made in detail to preferred embodiments of the invention, examples of which are illustrated in the accompanying drawings.

Figure 1:
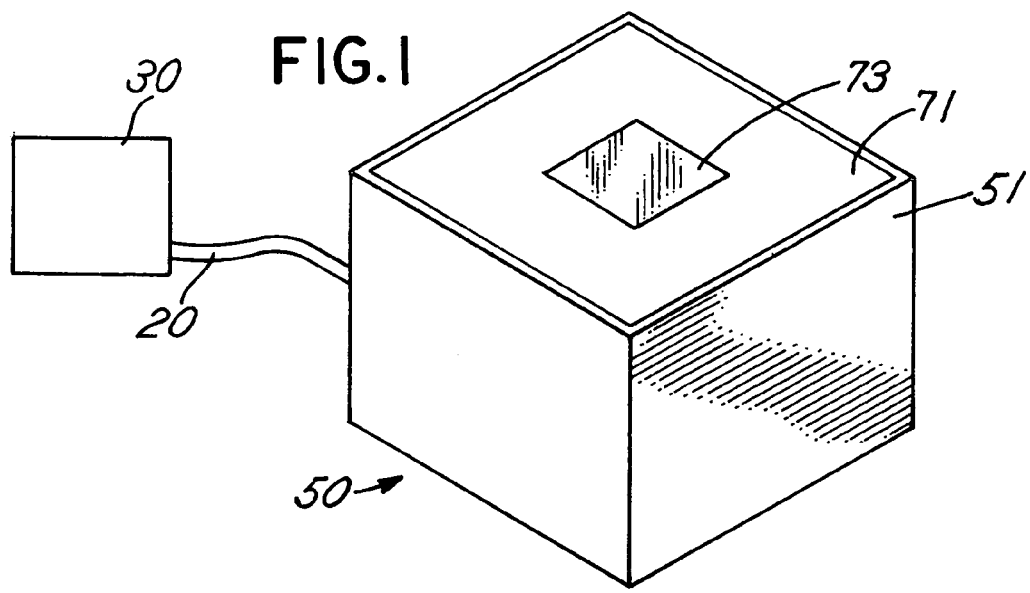
FIG. 1 is an isometric view illustrating an input device in accordance with an aspect of the present invention that includes an outer housing which encloses the scanner components, and that is coupled by a cable to a controller.
Figure 2:
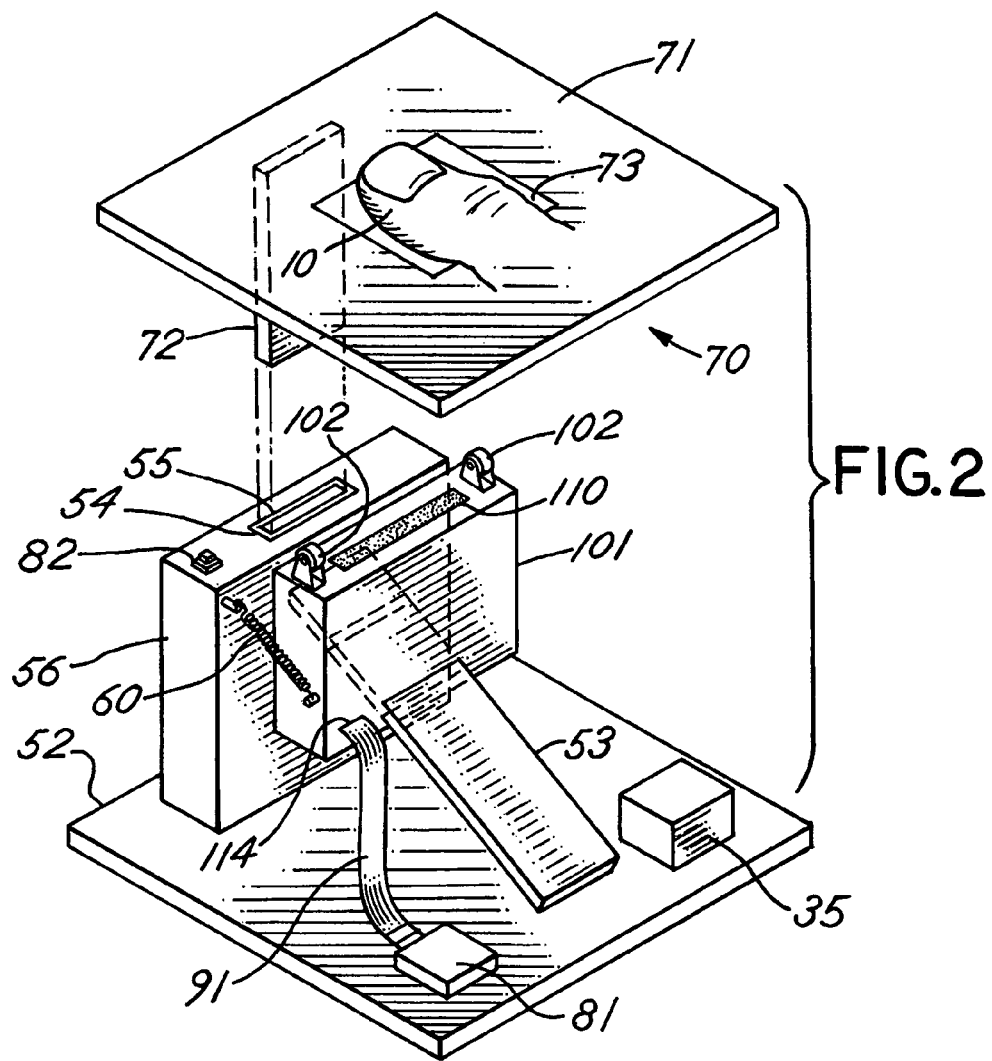
FIG. 2 is a partially-exploded schematic isometric view of the input device of FIG. 1 with the outer housing removed.

FIG. 1 illustrates a fingerprint scanner representative of an exemplary embodiment of the present invention. The input device as depicted in FIG. 1 and FIG. 2 comprises a housing, a translating platen and a translating scan head. The platen translates in a first direction and the scan head translates in a second direction so that the scan head can translate across the platen. As depicted in FIG. 1, the input device 50 can be connected to a controller 30 by a cable 20. Alternatively, the input device 50 could connect to the controller 30 via a wireless coupling, such as a wireless transmitter on the input device 50 and a wireless receiver on the controller 30. In an embodiment, the controller 30 can be a personal computer or other computer devices. Controller 30 preferably includes processing and memory. In exemplary embodiment, the controller can be contained within the device. Biometric images include fingerprints, palmprints, handprints, toeprints, footprints and the like. For ease of explanation, the embodiments herein are described in terms of scanning fingerprints but devices for use with other biometric images are envisions.

The input device 50 has an outer housing 51. The outer housing 51 can be made of an ABS plastic but other materials such as metal and other plastics are also suitable. The input device 50 includes a platen 71, the platen 71 having a platen window 73. The outer housing 51 encloses the electrical components of the input device but the platen 71 including the platen window 73 is not covered. In an exemplary embodiment, the outer housing 51 could also enclose part of the platen 71 while not enclosing the platen window 73. In an exemplary embodiment, the housing 51 could include a removable cover for protecting the platen window 73. In operation, a user may press his finger 10 on the platen window 73 of the moveable platen 71. The pressure placed on the platen window 73 by the finger 10 causes the platen 71 with the platen window 73 to translate and can activate the fingerprint scanning.

FIG. 2 illustrates a simplified partially-exploded view of an embodiment shown in FIG. 1 with the outer housing 51 removed. As depicted in FIG. 2, the finger 10 is placed on the platen window 73. The platen window 73 provides a substantially flat surface configured to provide a contact area for the fingerprint of the user. A guide member 72 is coupled to the platen 71. Located within housing frame 56, guiding slot 54 is adaptive to receive guide member 72. In the embodiment as depicted, the outer surface of guide member 72 is in contact with the inner surface of guide slot 54. Thus, guide member 72 and guide slot 54 help control the motion of platen 71 relative to housing frame 56, and preferably are of non-circular shape. Optional bearing system 55 can be used to provide a reduction in the friction force encountered when the guide member 72 is inserted into the guiding slot 54.

Housing frame 56 may be mounted to support surface 1 and supports angled surface way 53 and, as depicted in FIG. 2, can be connected to housing base 52. Housing base 52 may be a PCB. As illustrated in FIG. 2, the angled surface way 53 is beam shaped; however, other angled way structures are also contemplated, including a ramp, a rail, opposing guide tracks, and other well-known structures suitable for providing controlled linear translation on an angle. The angled surface way 53 supports the scan head assembly 100, which comprises scan head frame 101, scan head roller 102 and scan head 110. Angled surface way 53 also provides a controlled path of translation for scan head frame 101. The downward force exerted upon the scan head frame 101 causes the scan head frame 101 to translate along the angled surface way 53 in an angled, downward direction. Thus, vertical movement of the platen 71 causes both vertical and horizontal movement of the scan head frame 101. The horizontal movement allows the scan head frame 101 to traverse across at least a portion of the platen window 73 and the platen 71. Therefore, the user pressing down the finger 10 on the platen window 73 is what causes the scan head frame 101 to traverse the fingerprint image of the user.

Resisting the downward angled translation of the scan head frame 101 is a biasing device 60. The biasing device directs the scan head frame 101 towards a first position. As depicted in FIG. 2, the biasing device is return spring 60, a coiled spring shown in tension. Other potential biasing devices include, but are not limited to, leaf springs, coiled springs, torsion springs, and air springs, in compression or tension.

As depicted in FIG. 2, the biometric image that is captured can be transferred from the scan head 110 (discussed below) via a ribbon cable 91 to a memory 81. The ribbon cable 91 can be attached to the scan head frame 101 via a ribbon port 114, the ribbon port 114 being associated with the scan head 110 and allowing the ribbon cable 91 to interface with the scan head 110. As can be appreciated, the ribbon cable 91 is of sufficient length and flexibility to allow the scan head frame 101 to freely travel along the angled surface way 53. As depicted, controller 35 controls the scan head 110. Other components such as the electrical circuits are not shown, such components being well known in the art.

Figure 3A:
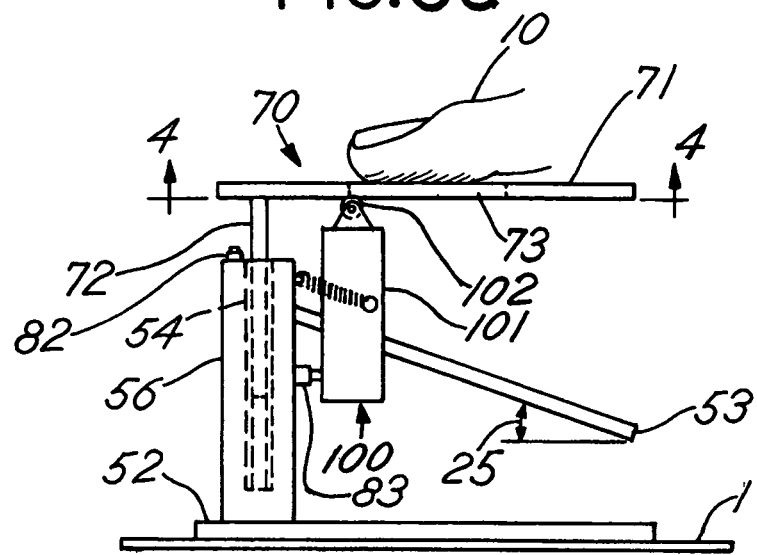
FIG. 3a is a simplified side view of the input device of FIG. 1, with the outer housing removed, where the platen assembly is in an initial position.

FIG. 3a is a simplified illustration of the embodiment shown in FIG. 2, the platen assembly 70 being in a first initial position. The downward movement of the platen assembly 70 can initiate the start of the scanning of the fingerprint by changing the state of a sensor. In an exemplary embodiment, the initiation of the scanning is accomplished by changing the state of start of scan sensor, depicted here as start of scan switch 83. While start of scan sensor is depicted as a push-button switch, other sensors are envisioned. As depicted, movement of the scan head frame 101 away from the housing frame 56 changes the state of start of scan switch 83. Alternatively, the initiation of the scanning can be accomplished by other user based inputs such as activating software. Once activated, the scan head can monitor the encoder target 74 until a predetermined pattern indicated that a scan line (not shown and discussed below) should be captured.

As depicted in FIG. 3a, a user places his finger 10 on the platen window 73 and applies a downward force (e.g. presses down with the finger 10). This force causes the platen 71 with platen window 73 to move in a downward vertical direction. The downward movement of the platen 71 causes the guide member 72 to be directed into the guiding slot 54 contained in the housing frame 56. As depicted, housing frame 56 is supported by support surface 1. The downward movement of the platen window 73 causes a downward force to be transferred to the scan head frame 101 through the scan head roller 102. The downward force directed towards the scan head frame 101 causes the scan head frame 101 to translate along the angled surface way 53, the translation being opposed by return spring 60. As the scan head frame 101 translates along the angled surface way 53, the scan head frame 101 also traverses across the platen window 73. This traversing of the platen window 73 allows the scan head 110 to capture a series of scan lines.

Figure 3B:
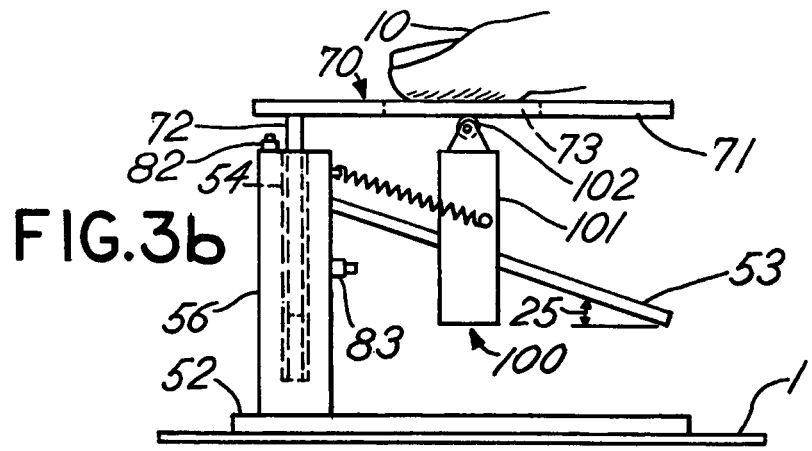
FIG. 3b is a simplified side view of the input device of FIG. 1, with the outer housing removed, where the platen assembly is in a middle position.

FIG. 3b is illustrative of the embodiment shown in FIG. 3a, with the platen assembly 70 in a middle position. As depicted, the start of scan switch is still in a second state and the scan head 110 is actively scanning. Thus, as depicted, the start of scan switch 83 has turned the scan head 110 on and the end of scan switch 82 has not turned the scan head 110 off.

Figure 3C:
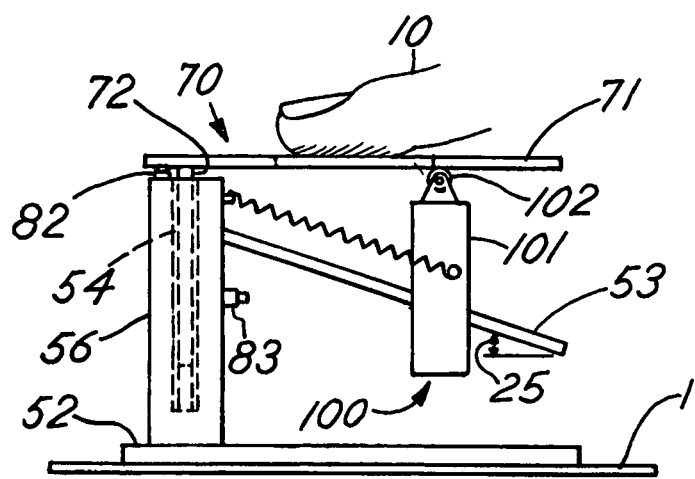
FIG. 3c is a simplified side view of the input device of FIG. 1, with the outer housing removed, where the platen assembly is in an end position.

FIG. 3c is illustrative of the embodiment shown in FIG. 3a with the platen 71 in an end position. As depicted, the end of scan sensor, here shown as end of scan switch 82, is activated by contact between the platen 71 and the end of scan switch 82. The contact occurs when the platen window 73 has been depressed enough to allow the fingerprint image to be captured. A change in the state of the end of scan switch can signal the controller to deactivate the scan head 110. In an exemplary embodiment, the end of scan switch 82 can provide audible feedback, such as a click or other noise, to notify the user that the scan is complete. Once the user is notified that the scan is complete, the user removes finger 10. The force exerted by the return spring 60 causes the scan head frame 101 to translate up the angled surface way 53 and the movement of the scan head frame 101 exerts a force on the platen assembly 70 that directs the platen assembly 70 to return to the initial position. If start of scan switch 83 is used, the biasing device, here shown as return spring 60, can be configured to exert enough force to reset start of scan switch 83.

Thus, as depicted in FIG. 3c, the downward force exerted by the finger 10 pressing on the platen window 73 exceeds the cumulative force of the spring force of return spring 60, the friction force along the angled surface way 53, the friction force along the platen path 75, and the friction force along the guiding slot 54. Methods of varying the design friction coefficient are well known and include the use of bearings and/or coatings. When providing a scanner designed for fingerprints, it is desirable that the total force required to depress the platen assembly 70 be within the range of one quarter to one half pound-force. As can be readily appreciated, the total force required to move the platen window can be modulated by keeping the friction forces relatively constant while varying the angle 25 of the angled surface way 53 and also varying the resistance of the biasing device, depicted here as return spring 60. Depending on the methods chosen to reduce the friction, in an exemplary embodiment the angle 25 of the angled surface way 53 is within the range of between 15 to 45 degrees. Increasing the angle 25 of the angled surface way 53 allows for a decreased friction force along the angled surface way but an increased angle 25 of the angled surface way 53 also requires a greater downward range of travel by the platen assembly 70. Therefore, it is preferred to keep the angle 25 of the angled surface way 53 at or below 30 degrees so as to limit the range of downward movement required by the platen assembly 70 to ensure the scan head 110 traverses the fingerprint image.

As discussed above, numerous methods of reducing friction exist. As depicted in FIG. 2, bearing system 55 comprises a linear bearing for reducing the friction force along the guiding slot 54. As depicted in FIG. 2, a scan head roller 102 can be used to reduce the friction force along the platen path 75. While not shown in FIG. 2, a friction reducing element such as a bearing, a roller, or a coating could be used to encoder target would cause a computer to beep so as to notify the user that the scan was complete.

Figure 4:
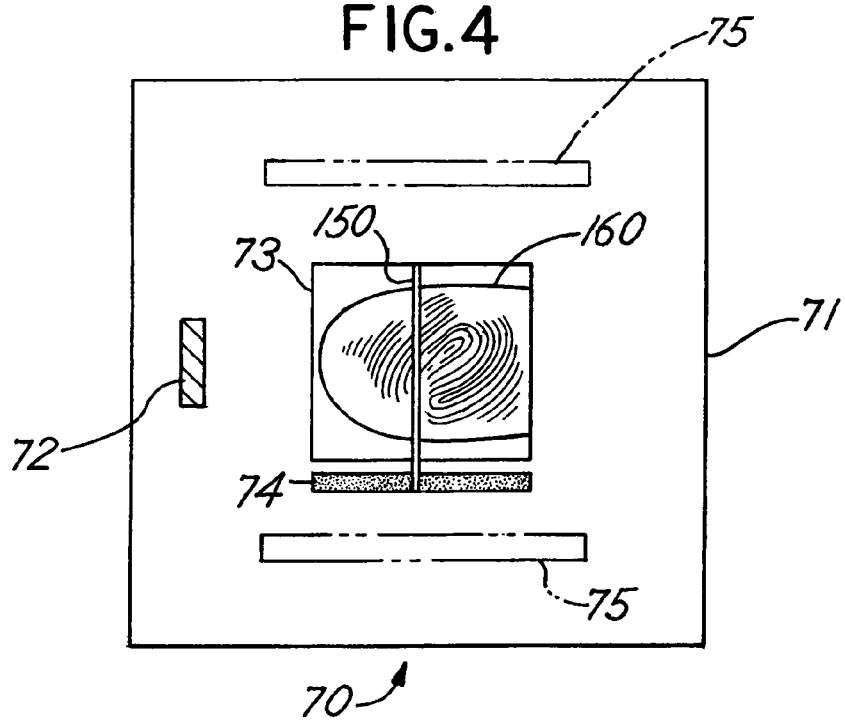

FIG. 4 is cross-sectional view of the platen assembly 70 depicted in FIG. 3a, taken along the lines 4-4. As depicted in FIG. 4, the platen window 73 can be fashioned of glass or other suitable materials such as polycarbonate and the like. In addition, it may be advantageous to coat the platen window 73 with silicone in a known manner to improve the platen window's characteristics for receiving fingerprints. The platen 71, which can be fashion of any suitable material including ABS plastic, other plastic, or metal, supports the platen window 73 and provides a platen path 75 for the scan head rollers 102 to traverse. The platen 71 connects the platen window 73 to the platen vertical motion way 72. The guide member 72 and the platen frame 73 can be formed together out of ABS plastic, however the guide member 72 can also be formed of other suitable materials and can be attached to the platen 71 via any desirable method including using glue, using fasteners, using a press-fit and/or using a weld. The platen assembly 70 can also include an encoder target. As depicted in FIG. 4, an encoder target 74 is associated with the platen window 73. While the encoder target 74 is shown as a separate component in FIG. 4, the encoder target 74 can be integrated into the platen window 73 by creating a pattern of darker and lighter regions on the platen window 73. Alternatively, encoder target 74 can be integrated into the underside of the platen 71.

As depicted in FIG. 4, the scan head 110 traverses the platen window 73 as the platen assembly 70 is translated. As the scan head 110 traverses, the scan head 110 scans a scan line 150. As depicted in FIG. 4, the scan line 150 covers both the fingerprint image 160 and the encoder target 74. Alternatively, the scan line 150 may be made by the combination of a plurality of scan heads.

Figure 5:
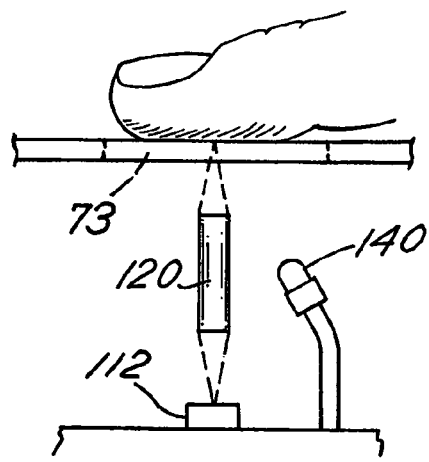
FIG. 5 is a simplified illustration of a scan head.

FIG. 5 is a simplified illustration of a typical scan head. As depicted in FIG. 5, the scan head 110 may be comprise of a light source 140, such as a LED, a gradient index lens array 120, such as a Selfoc® lens, and a contact image sensor 112. Light reflected off the biometric image and the encoder target 74 passes through the lens array and is focused onto the sensor 112. Such scan heads are well known and commercial versions of scan heads using a contact image sensor are made by Rohm, Toshiba and Peripheral Imaging Corporation. Alternatively, the scan head 110 may use folded optical paths to capture the fingerprint image on the platen window 73. As can be appreciated by one of skill in the art, the type of optical scan head is not critical to the present invention. As can be further appreciated, the scan head could be a two-piece design, with one piece adapted to scan the biometric image and one piece adapted to scan an encoder target.

In should be noted that above FIG. 3a, FIG. 3b, and FIG. 3c are illustrative of an embodiment with vertical movement of the platen assembly 70. As depicted, the platen assembly is substantially parallel to the support surface 1. While support surface 1 is depicted as being horizontal, other angles for the support surface 1 are envisioned.

Figure 6:
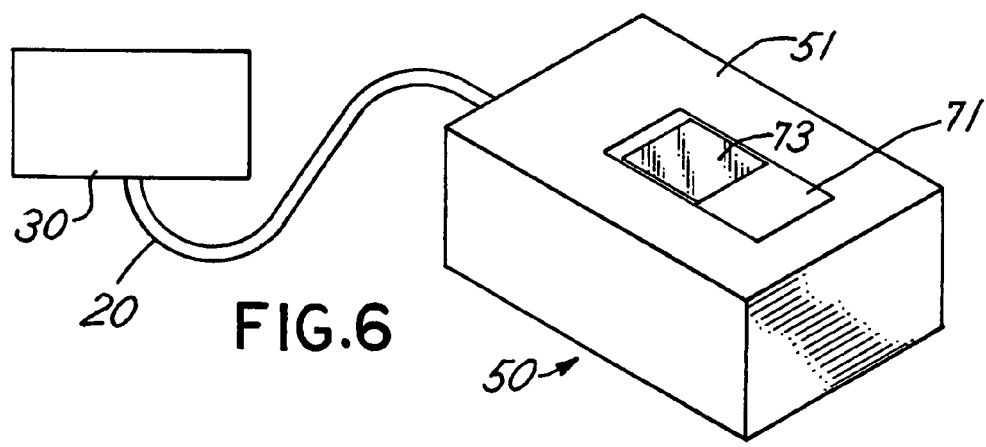
FIG. 6 is an isometric view illustrating an input device in accordance with another embodiment of the present invention that includes an outer housing which encloses the scanner components and that is coupled by a cable to a controller.

FIG. 6 illustrates a fingerprint scanner representative of an alternative exemplary embodiment of the present invention. The user places a finger on window of a platen and slides the platen parallel to a support surface while the scan head remains fixed. The relative movement between the scan head and platen allows for scanning the fingerprint. As depicted, the input device 50 can be connected to a controller 30 by a cable 20. Alternatively, the input device 50 could connect to the controller 30 via a wireless coupling, such as a wireless transmitter on the input device 50 and a wireless receiver on the controller 30. In an embodiment, the controller 30 can be a personal computer or other computer devices. In an exemplary embodiment, the controller can be contained within the device. Preferably the controller has processing and memory capabilities.

The input device 150 has an outer housing 151. The outer housing 151 is preferably made of an ABS plastic but other materials such as metal and other plastics are also suitable. The outer housing 151 encloses the electrical components of the input device 50. A portion of the platen 171, which includes a platen window 73, preferably is not covered. In an exemplary embodiment, the platen window 73 is covered by a removable cover. In operation, a user may press a finger 10 on the platen window 73 and translate the platen 171 with the platen window 73. The movement of the platen 171 by the finger 10 can activate the fingerprint scanning.

Figure 7A:
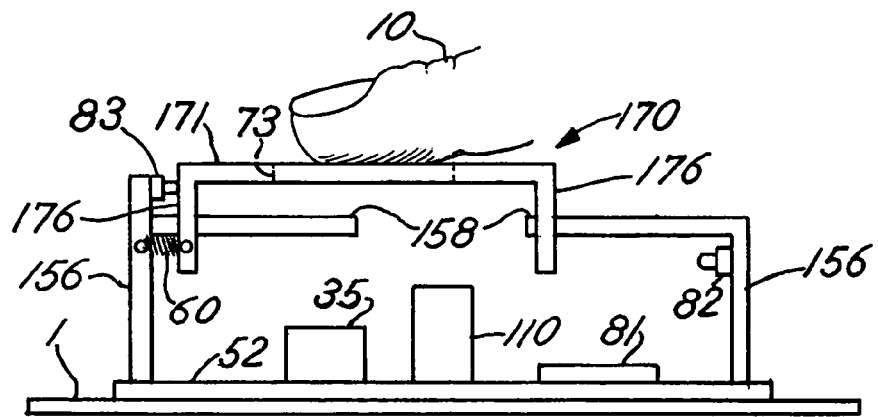
FIG. 7a is a simplified side view of the input device illustrated in FIG. 5 with the outer housing removed, where the platen assembly is in an initial position.

FIG. 7a is a simplified illustration of the embodiment in FIG. 6 with the outer housing 151 removed and the platen 171 in a first position. As depicted in FIG. 7a, the finger 10 is placed on the platen window 73. As discussed above, platen window 73 provides a substantially flat surface configured to provide a contact area for the fingerprint of the user. The platen window 73 is formed of glass or suitable plastic materials such as polycarbonate and the like. Platen frame support 176 supports the platen 171 and the platen window 73. The platen 171 and frame support 176 can be formed together out of ABS plastic. Alternatively, the platen 171 and platen frame support 176 can be made of other suitable materials such as plastic and/or metal and can be joined together in a desirable manner, including using glue, using a fastener, using a weld or using a press fitting. As depicted in FIG. 7*a*, the platen frame support 176 moves along a housing motion way 158. The platen frame support 176 can move on bearings or simply slide along the housing motion way 158. The housing motion way 158 is supported by housing frame 156. Housing frame 156 is connected to housing base 152 and is supported by support surface 101. Mounted to housing base 152 is scan head 110.

As illustrated in FIG. 7*a*, the finger 10 is placed on the platen window 73 and the user exerts a force on the platen window 73 (i.e. the user presses down and slides the platen 171 and the platen window 73 with the finger 10). The translation of the platen 171 can initiate a change in the state of a start of scan sensor 83, depicted as start of scan switch 83. The change in state of start of scan switch 83 can activate the scan head 110. Once activated, the scan head can continuously scan until deactivated. The force exerted on the platen window 73 causes the platen 171 to translate along the housing motion way 158. The translation of the platen 171 allows the platen window 73 to traverse the scan head 110 so that the scan head 110 can capture a series of scan lines representative of the fingerprint of the user.

As the platen 171 translates, a biasing device 60 opposes the movement. The biasing device directs the platen 171 towards a first initial position. As depicted in FIG. 7*a*, the biasing device is return spring 60, shown in tension. The other potential biasing devices include, but are not limited to, leaf springs, coiled springs, torsion springs, and air springs, in compression or tension.

Figure 7B:
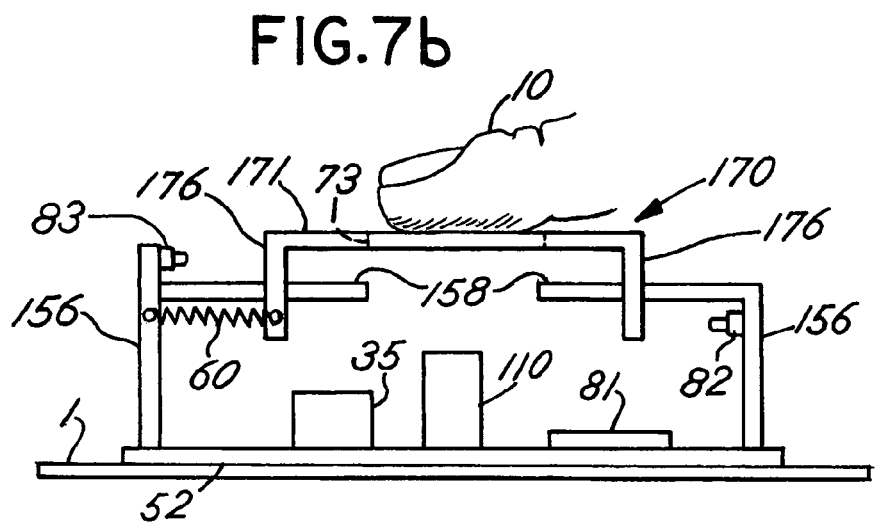
FIG. 7c is a side view of the embodiment illustrated in FIG. 5 with the outer housing removed, where the platen assembly is in a middle position.

FIG. 7*b* illustrates the embodiment depicted in FIG. 7*a* with the platen 171 in a middle position. As depicted, the scan head 110 is scanning the fingerprint image 160 of the user and is also scanning the encoder target 74. Thus, as depicted, start of scan switch 83 has activated the scan head 110 and the end of scan sensor 82, here depicted as end of scan switch 82, has not deactivated the scan head 110.

Figure 7C:
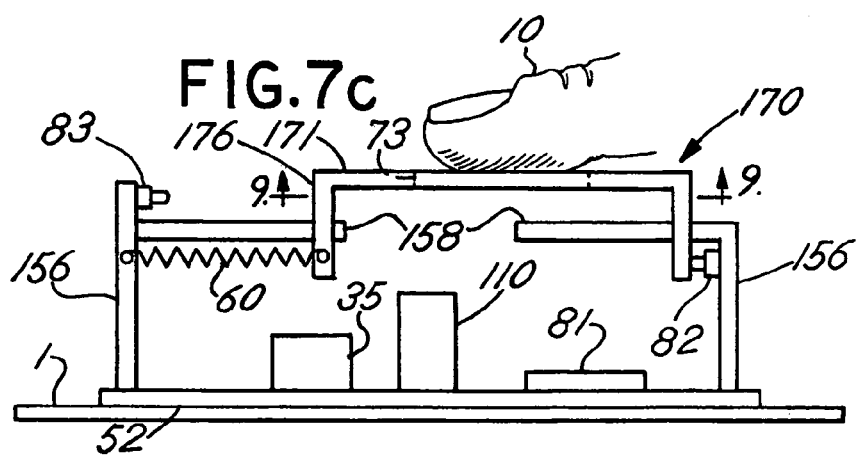

FIG. 7*c* illustrates the embodiment depicted in FIG. 7*a* with the platen 171 in an end position. As depicted in FIG. 7*c*, the force applied by the finger 10 moves the platen assembly 70 along the housing motion way 58 until the end of scan switch 82 is depressed. As depicted, the end of scan switch 82 is activated by contact with the platen support frame 76. In an alternative embodiment, the end of scan switch 82 could be activated by contact with the platen 71. Changing the state of the end of scan switch signals to the controller that the scan is complete. The controller can then deactivate the scan head 110 and the scan lines can be processed and assembled.

Therefore, movement of the platen 171 away from the initial position can change the state of the start of scan switch 83 and signal to the controller to activate the scan head 110. The translation of the platen 171 allows the scan head 110 to capture the series of scan lines. Finally, the movement of the platen 171 causes the state of the end of scan switch to be changed and the change signals to the controller that the scan is complete so that the scan head 110 can be shut off. The sensors can provide feedback to the user in the form of audible sounds and the sensors can also signal the controller to provide feedback to the user in the form of a controller generated sound or other user notification. In an alternative embodiment, the end of scan sensor can be eliminated and an end of scan pattern that indicates a predetermined distance has been traveled can be included on the encoder target 74.

In an exemplary embodiment, both sensors can be eliminated and the scan head 110 could be activated by the user through software activation. For example, the user could request access that triggers a request for user verification and the need for user verification activates the scan head. In this embodiment, a predetermined pattern could be used to indicate the scan was complete. Alternatively, the scan head can scan for a predetermined length of time.

As discussed above, the force applied by the finger 10 to translate the platen assembly 70 overcomes the opposing force applied by the return spring 60 and the opposing friction force. As depicted in FIGS. 7*a*, 7*b*, and 7*c*, the primary friction force resisting the movement of the platen assembly 170 is the friction force along the housing motion way 158. The force applied by the finger has both a vertical and horizontal component. The vertical component of the force applied by the finger is necessary to minimize movement between the platen window 73 and the finger 10 and is preferably in the range of one fourth to one half a pound of force. The horizontal component most overcome the force exerted by the biasing device 60, here depicted as return spring 60 and the also the friction force along housing motion way 158. Keeping the friction force along the housing motion way 158 relatively small and thus relying to a greater extent on the opposing force provided by the biasing device 60 can provide a more consistent opposing force and therefore allow for greater consistency in scanning the fingerprint. As can be appreciated, the vertical component can be indirectly controlled by varying the resistance to horizontal movement. Naturally, an increase in the horizontal resistance (i.e. increasing the resistance of the biasing device) will tend to cause the user to press harder in the vertical direction.

FIG. 8*a* is an alternative embodiment of the present invention with the same housing profile as depicted in FIG. 6 but with an alternative support to effect sliding as compared to FIG. 7*a*. As depicted in FIG. 8*a*, a platen 271 has the platen window 73. The platen 271 is supported by platen frame support 276 along both sides. Platen frame support 276 provides a platen groove 277. As depicted, platen groove 277 is contained within platen frame support 276. Opposite platen groove 277 is a housing groove 258, housing groove 58 being contained in housing frame 256. Bearing system 255 is mounted between platen groove 277 and housing groove 258. Thus, platen groove 277 is supported by bearing system 255, and bearing system 255 is supported by housing groove 258. Housing motion way 258 is mounted to housing frame 256, and housing frame 256 is mounted to support surface 1 and connected to housing base 52.

FIG. 8*b* illustrates a side view of the embodiment shown in FIG. 8*a*. Thus, as depicted, bearing system 255 reduces the friction force that resists movement of the platen assembly 270 while also providing support for the platen assembly 270. As is readily apparent, platen assembly 270 translates in a sliding manner relatively parallel to the support surface 1. While support surface 1 is shown in a horizontal angle, other angles are envisioned.

FIG. 8*c* depicts an isometric view of the embodiment depicted 8*a*, illustrating the platen assembly 270 moved away from the first position. Similarly as in FIGS. 7*a*, 7*b* and 7*c*, a user places a finger 10 on the platen window 73 presses down and slides the platen 271. The force exerted on the platen 271 causes the platen assembly 270 to translate. The translation allows the scan head 110 to capture a series of scan line 150's.

As can be readily appreciated, a biasing device 60, here depicted as return spring 60, biases the platen assembly 270 in a first initial position and opposes movement of the platen assembly 270 away from the first position. Upon removal of the finger 10, return spring 60 will direct the platen assembly 270 toward the first position.

Thus, as depicted in FIGS. 7a, 7b, 7c, 8a, 8b, and 8c, the scan head 110 does not move relative to the housing base 52. Rather, the platen assembly 170 translates relative to the housing base 52 and the translation is relatively parallel to support surface 1. Therefore, the relative movement between the platen window 73 and the scan head 110 allows the scan head 110 to scan the fingerprint. As can be readily appreciated, while support surface 1 is illustrated as horizontal, other angles are contemplated.

FIG. 9 illustrates a simplified cross-sectional view of the platen assembly 170 depicted in FIG. 7c, taken along the line of 9-9. FIG. 9 is also representative of the platen assembly 270 in FIGS. 8a, 8b and 8c. As depicted in FIG. 9, the platen window 73 traverses the scan head 110 as the platen assembly 170 is translated. As the platen window 73 traverses, the scan head 110 scans a scan line 150. Thus, as depicted in FIG. 9, the scan line 150 covers both the fingerprint image 160 and the encoder target 74. Therefore, as depicted, the scan head 110 scans the encoder target 74 at the same time the scan head 110 is scanning the fingerprint image 160 on the platen window 73. As the scan head 110 traverses along the encoder target 74, the scan head 110 encounters predetermined patterns found on the encoder target 74. As depicted, the scan head 110 can capture a new scan line 150, the scan line 150 including both a portion of a pattern on the encoder target and a portion of the fingerprint image, when the pattern found on the encoder target matches the comparison pattern. The various scan lines 150's can then processed and assembled to form an image representative of the fingerprint image 160.

As discussed above, FIG. 5 is a simplified illustration of a typical scan head of the embodiment depicted in FIG. 6. Such scan heads are well known and commercial versions of scan heads using a contact image sensor are made by Rohm, Toshiba and Peripheral Imaging Corporation. Alternatively, the scan head 110 may use folded optical paths to capture the fingerprint image on the platen window 73.

In operation, an exemplary embodiment has the scan head 110 continuously capture scan line 150's. The series of scan lines are then combined based on the time of capture and the pattern of encoder target 74 that was captured. As can be appreciated, continuous capture of scan line 150's can be hardware intensive.

Figure 10:
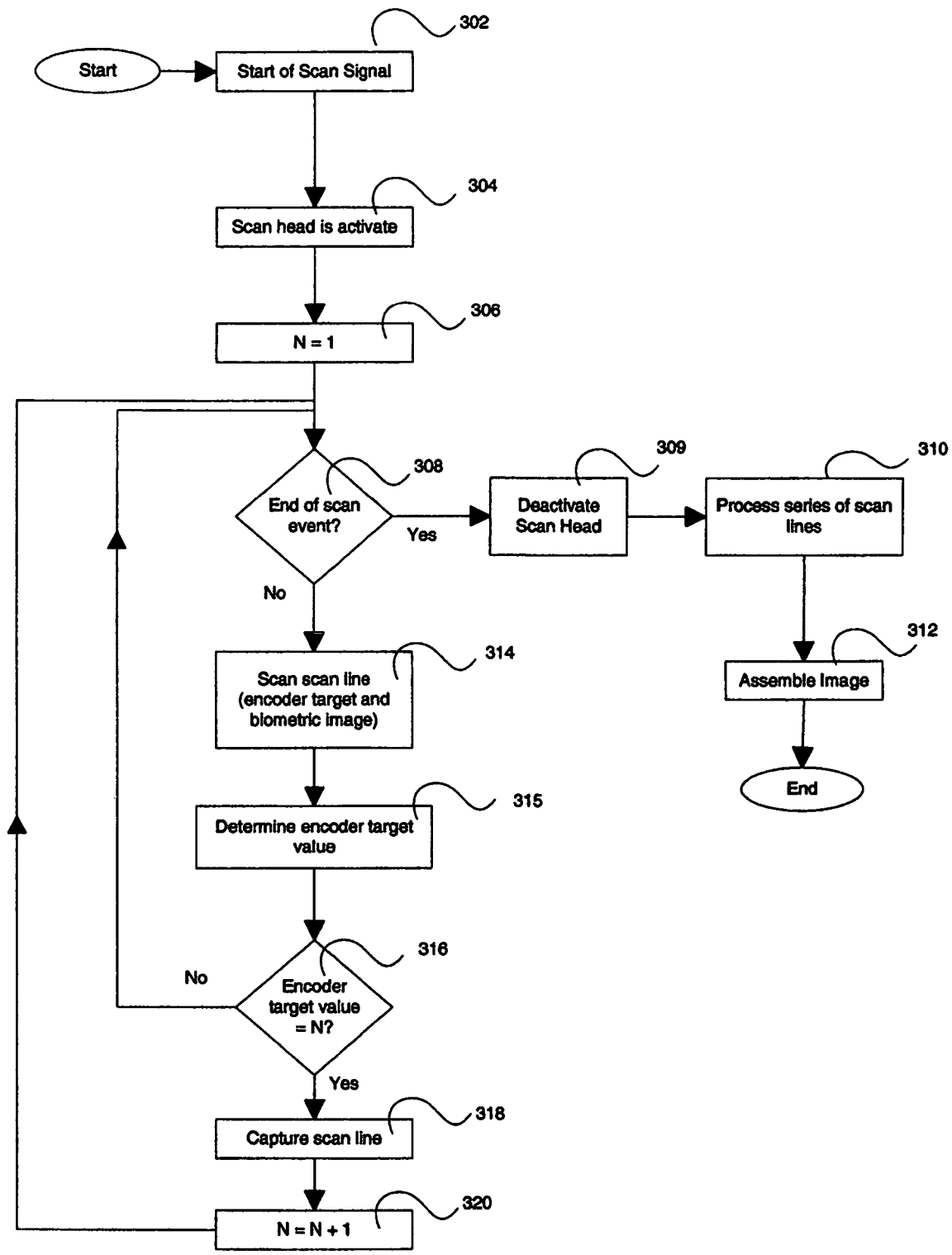

FIG. 10 provides an alternative exemplary embodiment for controlling the scan head 110. In general, a particular pattern on the encoder target 74 is looked for and a scan line 150 is not captured until that particular pattern is observed. Therefore, in this alternative embodiment the value of the pattern on the encoder target 74 determines if a scan line 150 should be captured. Thus, FIG. 10 illustrates a more efficient manner of capturing scan line 150's by eliminating the need to capture scan lines that were previously captured.

FIG. 10 illustrates an alternative exemplary embodiment of a method for controlling the scan head 110 with a non-repeating encoder target 74. In step 302, a start of scan signal is provided. The start of scan signal can be provided by activation of start of scan switch 83. Alternatively the start of scan signal can be provided by other user input. In step 304, the scan head 110 is activated. In step 306, the value of N is set equal to 1. In step 308, a check is made to see if an end of scan event has occurred. As previously mentioned, an end of scan switch 82 could provide an end of scan event. Alternatively, a predetermined pattern on the encoder target could be used to provide an end of scan event. For example, and end of scan event could be triggered when the comparison value N is greater then a predetermined value.

If an end of scan event has not occurred in step 308, the next step is step 314. In step 314, the scan head scans a scan line 150, which includes a portion of a pattern on the encoder target 74. In step 315, the value of the scanned encoder target pattern is determined. Next, in step 316, the value of scanned encoder target pattern is compared to the value of N. In an embodiment where the pattern on the encoder target is a binary representation of numerical values, the numerical value of the scanned encoder target pattern can be directly compared to N. In an alternative embodiment, N can be used as a variable to point to the pattern that is to be used to compare with the scanned encoder target pattern. If the value of the scanned encoder target pattern is not equal to N, step 308 is repeated. The relative movement of the scan head 110 and the platen window 73 ensures that the scan head 110 will eventually observe a new pattern on the encoder target or activate an end of scan switch.

If the scanned encoder pattern of step is equal to N, then step 318 is next. In step 318, the scan head captures (i.e. saves) the scan line of the biometric image and the corresponding pattern on the encoder target. In step 320 the value of N is increased by 1 and step 308 is repeated. The above process continues until an end of scan event occurs.

If an end of scan event has occurred, step 309 is next. In step 309 the scan head 110 is deactivated. Then, in step 310 the scan lines are processed so that each line can be assembled in the proper order. Finally, in step 312, an image representative of the biometric image is assembled. The representative image can then be used to determine whether to grant the user access.

Figure 11:
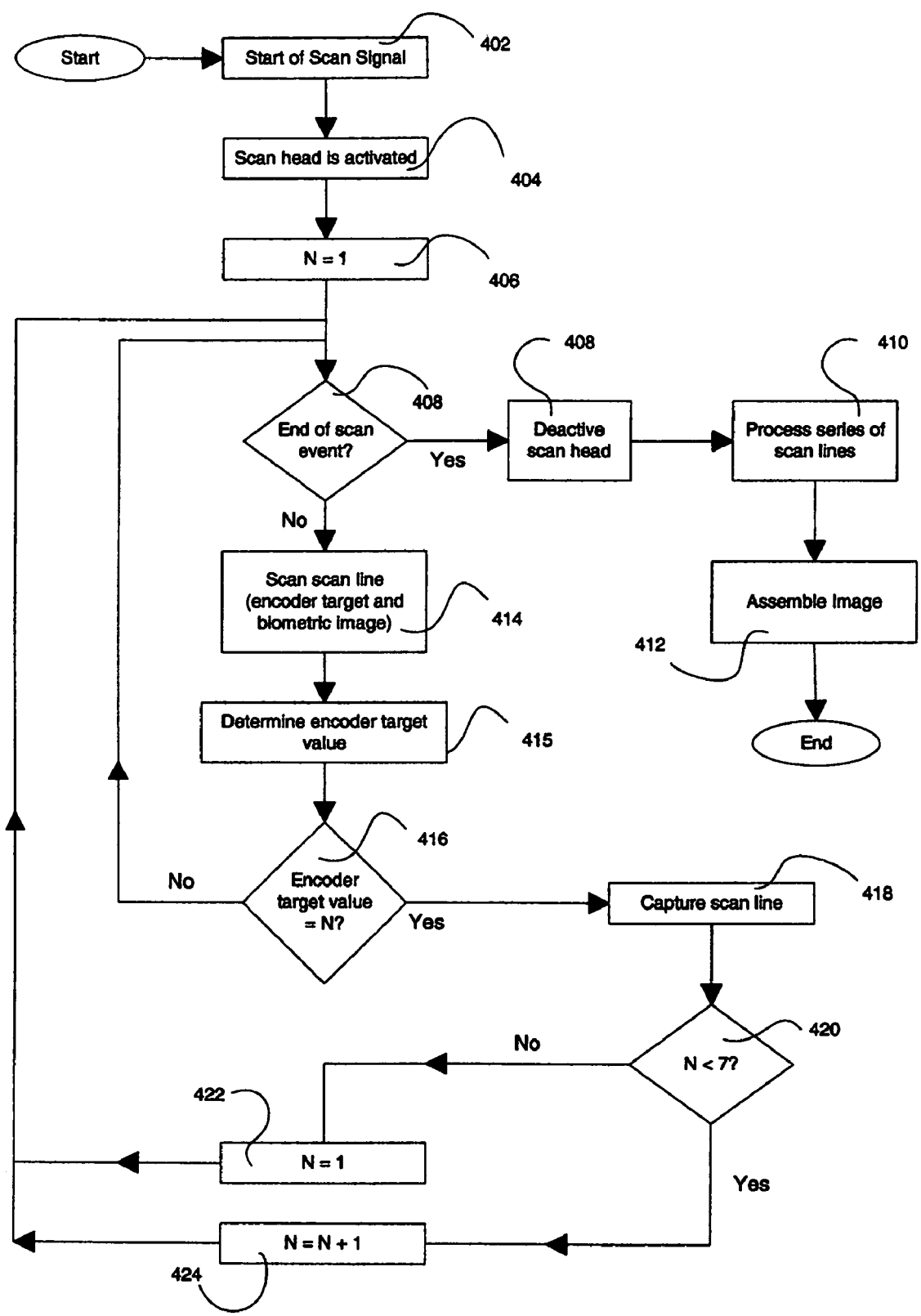
FIG. 11 illustrates a flow chart demonstrating an alternative method for controlling the scan head.

FIG. 11 depicts an alternative embodiment of a method for controlling scan head 110 with a repeating pattern on the encoder target 74. In step 402 a start of scan signal is provided. The start of scan signal can be provided by activation of start of scan switch 83. Alternatively, the start of scan signal can be provided by software. In step 404, the scan head 110 is activated. In step 406, the value of N is set equal to 1. In step 408, a check is made to see if an end of scan event has occurred. As previously mentioned, an end of scan switch 82 could provide an end of scan event. Alternatively, a predetermined pattern on the encoder target could be used to provide an end of scan event.

If an end of scan even has not occurred, the next step is 414. In step 414, the scan head scans a scan line which includes a portion of a pattern on the encoder target 74. In step 415, the value of the portion of the scanned encoder target pattern is determined. Next, in step 416, the value of the scanned encoder target pattern is compared to the value of N. In an embodiment where the pattern on the encoder target is a binary representation of numerical values, the numerical value of the scanned encoder target pattern can be directly compared to N. In an alternative embodiment, N can be used as a variable to point to the pattern that is to be used to compare with the scanned encoder target pattern. If the scanned encoder target pattern is not equal to N, step 408 is repeated. The relative movement of the scan head 110 and the platen window 73 ensures that the scan head 110 will eventually observe a new pattern on the encoder target or activate an end of scan switch.

If the scan encoder pattern is equal to N, the next step is 418. In step 418 the scan head captures (i.e. saves) a scan line of the biometric image and a portion of a pattern on the encoder target.

Next, in step 420 the value of the N is evaluated. If the value of N is not less then 7, the next step is 422. In step 422, the value of N is reset to equal 1 and step 408 is repeated. If the value of N is less then 7, the next step is step 428.

In step 428 the value of N is increased by 1 and then step 408 is repeated. Therefore, if N is equal to 1, then after 6 successive loops the value of N will be equal to 7. The next loop will reset N equal to 1, starting the cycle over again. The above process will continue until an end of scan event occurs.

If an end of scan event has occurred, step 409 is next. In step 409 the scan head 110 is deactivated. Then, in step 410 the scan lines are processed so that each line can be assembled in the proper order. Finally, in step 412, an image representative of the biometric image is assembled. The representative image can then be used to determine whether to grant the user access.

In an alternative exemplary embodiment of a method for controlling the scan head 110, the encoder target 74 is monitored and a scan line 150 is captured when the pattern on the encoder target 74 changes. Thus, the scan head 110 captures a scan line 150 containing a pattern on the encoder target 74. The encoder target 74 is continuously scanned and when a new pattern on the encoder target 74 is observed, a new scan line 150 is captured. This process is repeated until an end of scan event occurs. Thus, in this embodiment a predetermined value of the pattern is not used to determine when to capture a scan line 150. Rather, the change in the pattern is what triggers the capture of a scan line 150. As can be appreciated, numerous other methods for controlling the scan head 110 are possible, thus, the above methods are provided for illustrative purposes.

Figure 12A:
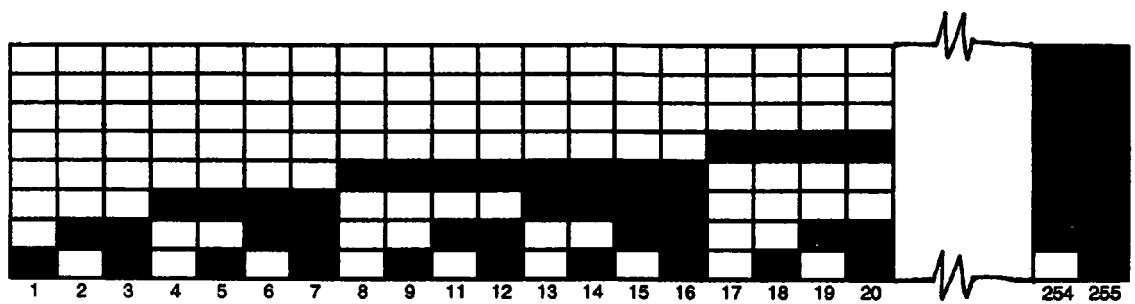
FIG. 12a is a plan view of an encoder target.

FIG. 12*a* is an exemplary embodiment of an encoder target 74 with a non-repeating pattern. As illustrated in FIG. 12*a*, the encoder target comprises an 8 region non-repeating pattern representing numbers 1 to 255 in binary form. The boxes represent the individual regions, which can be dark or light. The outline of the boxes, while currently shown for purposes of illustration, does not need to be visible on the actual encoder target. Starting from the left, pattern 1 is represented by the pattern having only the lower region darkened. Pattern two is represented by having the second region from the bottom darkened. Pattern three is represented by having both the bottom and the second from the bottom regions darkened. At the far right of the encoder target 74 depicted in 12*a*, all 8 regions are darkened, representing pattern 255. Thus, the numerical value represented by the binary pattern increases by one with each successive row until the value of 255 is reached. Therefore, a pattern having the values of 1 through 255 can be presented in binary fashion on an encoder target 74. Using such a pattern can allow a series of scan line 150's to be processed and assembled according to the pattern of the encoder target captured by the scan line 150. As can be readily appreciated, the use of color on the encoder target and a color sensitive contact image sensor could allow the use of fewer regions while still providing a non-repeating pattern that could extend the length of the scan area.

Figure 12B:
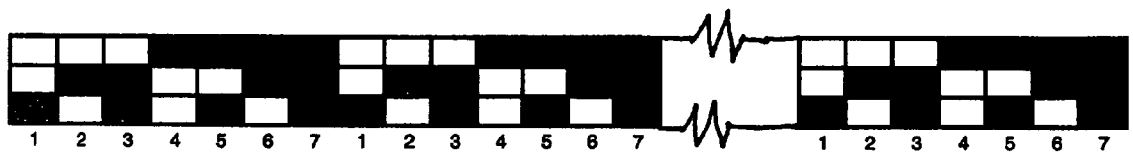
FIG. 12b is a plan view of an alternative embodiment of an encoder target.

FIG. 12*b* illustrates an alternative embodiment of an encoder target 74 using a repeating pattern comprising three regions. As in FIG. 12*a*, the individual regions are represented by the small boxes. Going from left to right, the first pattern having only the lower region darkened is representative of pattern 1, the next pattern having the middle pattern darkened is representative of pattern 2, this progression continuing until pattern 7 which is represented by having all three regions darkened. Thus, patterns 1-7 are binary representations of 1-7. As depicted in FIG. 12*b*, the sequence of pattern 1-pattern 7 is repeated the length of the encoder target 74. Thus, multiple scan line 150's will have the pattern 1 of encoder target 74. As can be readily appreciated, care should be utilized when processing the series of scan line 150's if a repeating pattern is used.

When the scan line 150's are captured, the data representing scan line 150 can be saved locally or can be sent to a remote location such as the controller. The series of scan line 150's that are captured can then be processed and assembled. In one embodiment, all the information is saved locally on the input device 50 and the input device contains the hardware needed to process and assemble the various scan line 150's into an image representative of the biometric image. In another embodiment, all the data is transferred off the input device and the processing and assembly of the various scan line 150's is done at a remote location. Naturally, some combination of the above two embodiments is also contemplated. Reducing the hardware on the input device reduces the cost of input device but typically results in an increase in the amount of data being sent from the input device to the remote location. In one alternative embodiment, a memory cache on the input device 50 can used for temporary storage of the data while the information is being transmitted to the appropriate remote location.

When the scan is complete, the series of captured scan line 150's can be processed. In one embodiment, the scan line 150 containing pattern 1 is placed on one end and the scan line 150 containing pattern 255 is placed on the opposite end with the remaining scan line 150's arranged in the appropriate numerical order. In this manner, the captured scan line 150's can be assembled in the correct order so as to ensure proper representation of the biometric image.

In an alternative embodiment, the scan line 150 containing the earliest capture time value is placed on one end and the scan line 150 with the latest capture time is placed on the opposite end. Then the rest of the scan line 150's would be placed in between these two scan lines, depending on the time of capture.

In an alternative embodiment, multiple scan line 150's can be duplicates of each other. For example, there could be 25 scan lines with the same scanned encoder target pattern and the same portion of the biometric image. In order to process the various scan line 150's, the scan line 150's can be grouped according to the scanned encoder target pattern. Then, the scan line 150 with the earliest capture date can be used and the rest of the scan line 150's with the same scanned encoder target pattern could be ignored. Once processed, the scan lines can be assembled to form image representative of the biometric image. Other methods of processing the captured scan line 150's are possible, thus the above embodiments are for illustrative purposes.

Once processed the series of scan line 150's can be assembled. Techniques for assembling scan line 150's, such as seaming adjacent images, are well known and therefore are within the knowledge of one of ordinary skill in the art.

It is recognized that the scanner will require some source of power. The power source can be internal to the input device, for example a battery, or it can be provided externally through a cable or a power cord plugged into an outlet or via some other desirable energy transmission method.

Once an image representative of the biometric image is obtained, the representative image could then be compared with the biometric image on file. A match between the representative image and the biometric image on file could allow the user access and a failure to provide a match could require the user to repeat the scan or deny access. As methods of comparing biometric images are well know, for example governmental agencies regularly compare fingerprints, such methods are within the knowledge of one of ordinary skill. The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. An input device for scanning a biometric image, comprising:
   a housing;
   a scan head movably mounted to the housing wherein the scan head is comprised of at least a light source;
   a platen moveably mounted to the housing and the scan head for movement relative to the housing and the scan head between a first position and a second position;
   an encoder target having a grid pattern representing a plurality of binary numbers, wherein the boxed pattern and the platen are associated to allow the scan head to capture a plurality of scan lines such that each member of the plurality of scan lines includes at least a portion of the grid pattern representing a binary number and at least a portion of the platen, and wherein the captured plurality of scan line are assembled based on a binary number value associated with the captured portion of the grid pattern;
   a biasing device configured to bias the platen toward the first position;
   a start of scan switch located such that the start of scan switch is activated when the platen moves in a downward translation from the first position; and
   an end of scan switch located such that the end of scan switch is activated when the platen is at the second position.

2. The device of claim 1, wherein the scan head further comprises a linear array of gradient indexed lenses.

3. The device of claim 1, wherein the biasing device is an extension spring.

4. The device of claim 1, wherein the biometric image is a fingerprint.

5. The device of claim 1, wherein the encoder target comprises a non-repeating pattern that represent binary numbers.

6. The device of claim 1, wherein the encoder target is integrated into the platen.

7. The device of claim 2, wherein the scan head is adaptive to capture a scan line as the platen is moved.

8. The device of claim 1, wherein the scan head is configured to continuously scan the grid pattern on the encoder target and to capture a scan line of the biometric image when a member of the plurality binary numbers differs from an immediately previous member that is scanned on the encoder target.

9. The device of claim 8, wherein the binary number grid pattern on the encoder target is used to combine a series of scan lines to form an image representative of the biometric image.

10. The device of claim 9, wherein the binary number pattern on the encoder target represents about 255 binary numbers.

11. An input device for scanning a biometric image, comprising:
    a housing having an angled way;
    a platen moveably mounted to the housing for movement between a first position and a second position, the platen being adaptive to receive the biometric image;
    a scan head comprised of at least a light source, the scan head is moveably mounted to the angled way, wherein movement of the platen causes the scan head to translate along the angled way; and
    an encoder target having a grid pattern representing a plurality of binary numbers, wherein the grid pattern and the platen are associated to allow the scan head to capture a plurality of scan lines such that each member of the plurality of scan lines includes at least a portion of the grid pattern representing a binary number and at least a portion of the platen, and wherein the captured plurality of scan line are to be assembled based on the value associated with the captured portion of the grid pattern.

12. The device of claim 11, further comprising a spring, the spring biasing the scan head assembly against the platen so as to bias the platen toward the first position.

13. The device of claim 11, wherein the scan head is configured to scan the pattern on the encoder target and to capture a scan line of the biometric image and a portion of the grid pattern associated with the scan line when a member of the plurality of binary numbers has a value different from an immediately previously scanned member of the plurality of binary numbers on the encoder target.

14. The device of claim 11, wherein the grid pattern on the encoder target is used to combine a series of scan lines to form an image representative of the biometric image.

15. The device of claim 11, wherein a force applied to the platen is transferred to the scan head so as to direct the scan head to traverse the platen.

16. The device of claim 13, wherein the grid pattern is used to combine a series of scan lines to form an image representative of the biometric image, wherein the series of scan lines are combined in a sequential order based on the captured binary number associated with each of the series of scan lines.

17. The device of claim 12, further comprising a spring, the spring biasing the scan head assembly against the platen so as to bias the platen toward the first position 18. An input device for scanning a biometric image of a fingerprint, comprising:
    a housing having an angled way;
    a platen moveably mounted to the housing, wherein the platen moves in about a vertical direction;
    an encoder target associated with the platen, wherein the encoder target having a grid pattern representing a plurality of binary numbers, and wherein the pattern and the platen are associated to allow a scan head to capture a plurality of scan lines such that each member of the plurality of scan lines includes at least a portion of the pattern representing a binary number and at least a portion of the platen, and wherein the captured plurality of scan line are assembled based on the value associated with the captured portion of the pattern representing a binary number;
    the scan head, comprised of at least a light source, the scan head is moveably mounted to the angled way, wherein movement of the platen causes the scan head to traverse a length of the platen at a distance vertically constant from the platen as the platen moves in a vertical direction, the scan head configured, in operation, to capture a scan line of the fingerprint image and a portion of the pattern on the encoder target while traversing the platen, and wherein the scan head only captures a scan line of the fingerprint and the pattern when a continuous scan of the pattern identifies a binary number that differs from an immediately previous scanned binary number of the pattern; and an assembler to assemble the captured scan lines into an image representative of the fingerprint, wherein the captured scan lines are assembled in a sequence based on the binary number captured with each scan line.

19. The device of claim 18, wherein the scan head further comprises a linear array of gradient indexed lenses.

20. The device of claim 18, further comprising a biasing device, the biasing device configured to resist movement of the scan head from a first position to a second position.

21. The device of claim 18, wherein the encoder target comprises a repeating pattern representing about 7 binary numbers.

22. The device of claim 18, wherein the encoder target comprises a non-repeating pattern representing about 255 binary numbers.

\* \* \* \* \*

UNITED STATES PATENT AND TRADEMARK OFFICE
CERTIFICATE OF CORRECTION

Page 1 of 2

PATENT NO. : 7,526,109 B2
APPLICATION NO. : 10/722795
DATED : April 28, 2009
INVENTOR(S) : David D. Bohn et al.

It is certified that error appears in the above-identified patent and that said Letters Patent is hereby corrected as shown below:

In column 7, line 48, after "could be used to" insert -- reduce the friction coefficient between the scan frame 101 and angled surface way 53. While exemplary methods and structure for reducing the friction are depicted, these depictions are merely for illustrative purposes as methods and structures for reducing friction forces are well known.

As depicted in Figure 3a and Figure 3b and Figure 3c, the start of scan switch 83, located on the housing frame 56, is activated by movement of the scan head frame 101 away from an initial position. After the fingerprint has been scanned, the end of scan switch 82, located on the housing frame 56, is activated by contact with the platen 71 when the platen 71 is in an end position. Thus, as depicted, the vertical translation of the platen assembly 70 causes the activation of both the start of scan switch 83 and the end of scan switch 82. While both sensors are shown mounted to the housing frame 56, other locations are envisioned. For example, the end of switch scan 82 can be located in the guiding slot 54 and activated by contact with the guide member 72. The activation of both sensors can provide feedback to the user, for example the changing of state of one of the sensors could result in an audible beep generated by the controller. An example of a possible sensor is Alps' model # SKHMPWE010 switch. As can be ready appreciated, the location chosen for the end of scan switch 82 should preferably provide a relatively direct transfer of force between the platen assembly 70 and the end of scan switch 82.

In an exemplary embodiment, the end of scan switch 82 can be used in conjunction with an end of scan pattern on the encoder target 74. In an alternative exemplary embodiment, the end of scan switch 82 can be eliminated and an end of scan pattern can be used. The end of scan pattern signals that a predetermined distance has been traveled and that the scan head 110 can be deactivated. Removing the end of scan switch 82 reduces the cost of the system but may reduce the feedback to the user regarding the end of scan. Thus, removing the end of scan switch 82 would make it desirable to provide other means of user notification such as through an attached controller. In an exemplary embodiment, the scanning of a end of scan pattern on the --.

Signed and Sealed this
Third Day of May, 2011

David J. Kappos
*Director of the United States Patent and Trademark Office*

In column 15, line 46, in Claim 7, delete "claim 2," and insert -- claim 1, --, therefor.

In column 16, line 38, in Claim 17, delete "position" and insert -- position. --, therefor.

In column 18, line 66, in Claim 18, delete "previous" and insert -- previously --, therefor.